United States Patent [19]

Lehmkuhl

[11] 4,149,822
[45] Apr. 17, 1979

[54] HEADSTOCK BALANCING ARRANGEMENT FOR MACHINE TOOLS

[75] Inventor: Robert A. Lehmkuhl, Cincinnati, Ohio

[73] Assignee: The Carlton Machine Tool Company, Cincinnati, Ohio

[21] Appl. No.: 853,203

[22] Filed: Nov. 21, 1977

[51] Int. Cl.² .............................................. B23B 47/26
[52] U.S. Cl. .................................... 408/235; 90/11 R
[58] Field of Search ................ 408/234, 235; 90/11 R

[56] References Cited

U.S. PATENT DOCUMENTS 3,168,000  2/1965  Deflandre ............................ 408/235
3,671,133  6/1972  Galbarini et al. .................... 408/235

Primary Examiner—Leonidas Vlachos
Attorney, Agent, or Firm—Edward J. Utz

[57] ABSTRACT

This invention relates to a machine tool having an upright column movably supported on a bed with a saddle movable along the guide surface of the column, supported on the bed of the machine tool and a headstock with a balancing arrangement, comprising a bar supported at each of its ends by individual cables and the headstock counterbalanced by means of a hydraulic cylinder connected to said headstock, whereby upon the traversing of the headstock, the bar counterbalances the headstock to a series of cables.

3 Claims, 14 Drawing Figures

HEADSTOCK BALANCING ARRANGEMENT FOR MACHINE TOOLS

Machine tools, such as horizontal boring machines, horizontal milling-boring machines, profiling machines, and the like, comprise an upright column movable horizontally along a bed, a saddle which is movable vertically along a guide surface of the column, and a headstock which is displaceable horizontally or laterally of the column while being guided by the saddle. In machine tools having such a construction, the supporting conditions are changed when the headstock or the ram is displaced laterally of the column. As a result of such displacement, not only is the sliding element displaced and distorted, but also other adjacent sliding elements may be displaced or distorted.

This invention relates to an improved headstock balancing arrangement for machine tools and, more particularly, to such a balancing arrangement in which changes in the supporting conditions,, due to displacement of a headstock, are prevented.

In general my invention comprises a balancing system for a horizontally traveling headstock. The hydraulic cylinder is attached to the base of the column. The piston rod of the hydraulic cylinder is connected to a yoke which carries a double pulley which carry cables which are attached to each end of a floating bar. The floating bar is floatably connected to the vertical saddle by means of self-centering spring loaded shoes. The weight of the transversably movable headstock is transferred to the floating bar by means of a hydraulic cylinder and roller and yoke assembly. The hydraulic cylinder and roller and yoke assembly is secured to the headstock by means of a threaded stud located at the center of gravity of the headstock.

When the headstock moves along the vertical saddle it carries the hydraulic cylinder and roller and yoke assembly. The roller moves along the floatable horizontal bar which changes the tension in the cables in relation to the position of the headstock on the saddle. As the tension in the cables changes they stretch or contract accordingly, thus tilting the bar compressing the springs in the bar support assembly which is affixed to the vertical saddle. The tilting of the bar due to the stretching of the cables changes the vertical relationship of the roller and yoke assembly with respect to the headstock. This change in relationship is compensated for by movement of the piston inside the cylinder attached to the headstock and attached to the roller and yoke assembly.

An independent counterbalance system to support the verticle saddle comprises a hydraulic cylinder connected to the base of the column. The saddle is connected to the cylinder by means of a cable riding over a pair of pulleys.

Figure 1:
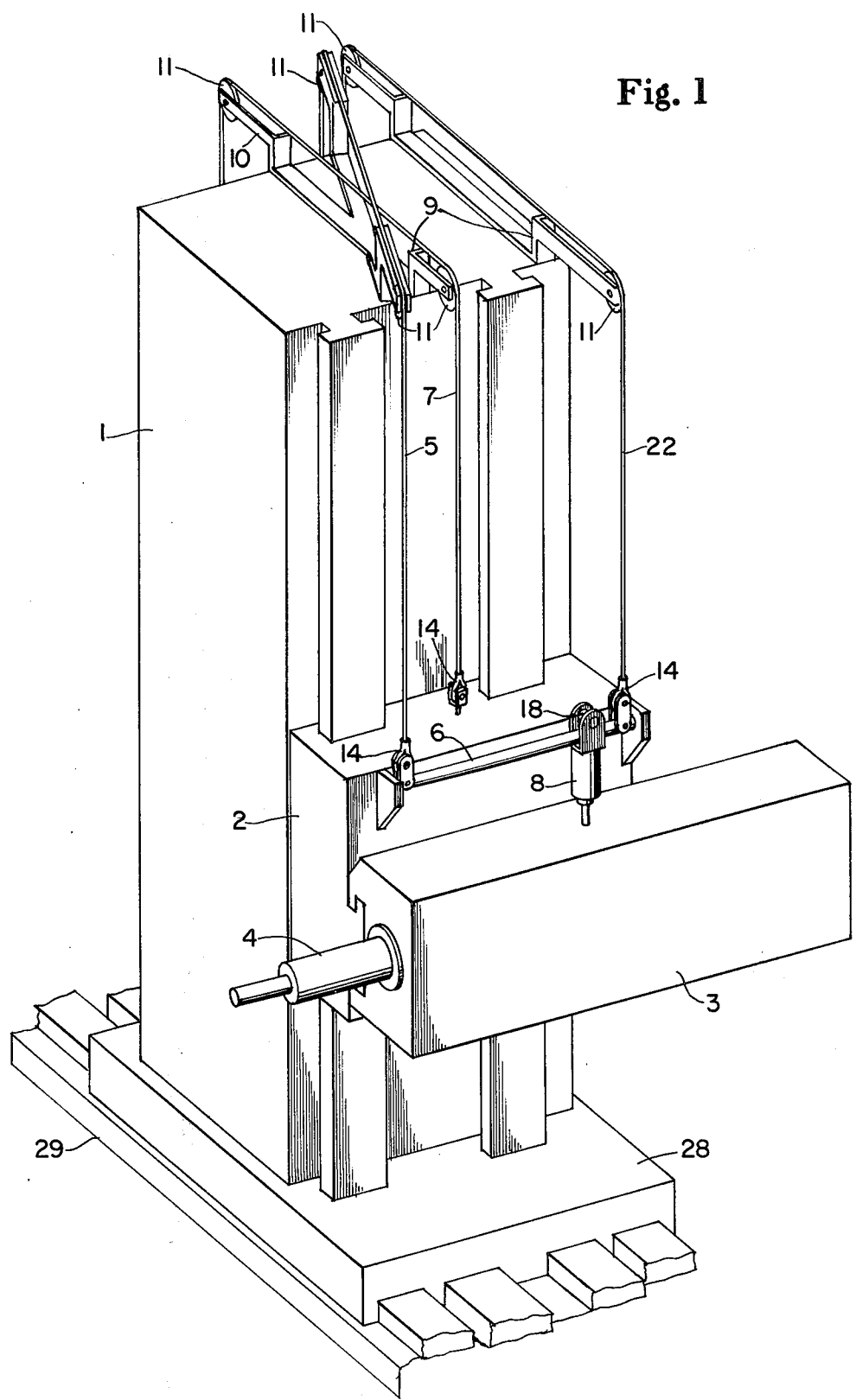
FIG. 1 is a view in perspective showing the machine of my invention.
Figure 2:
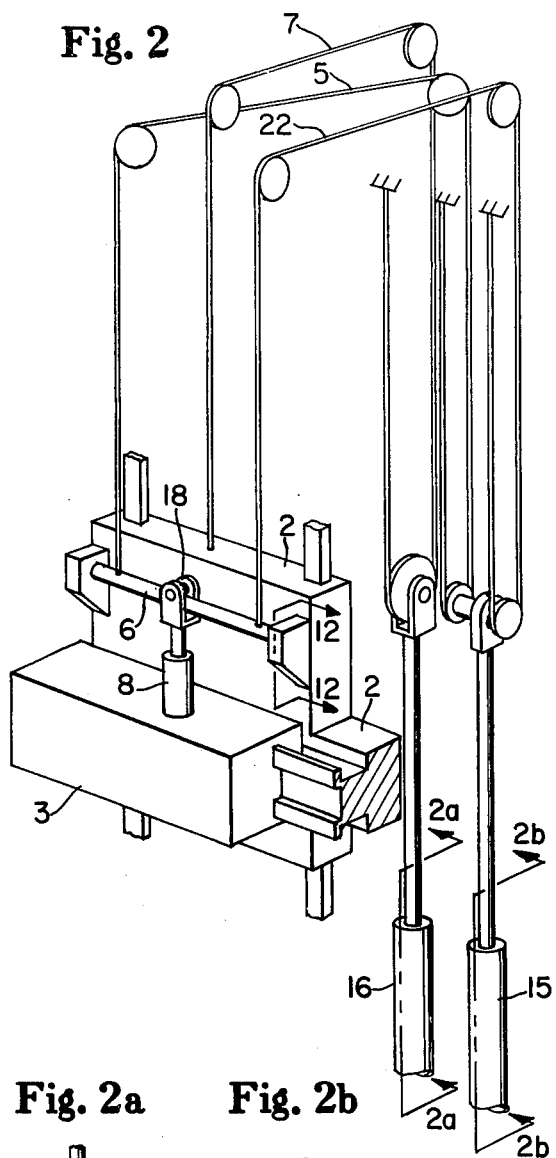
FIG. 2 is a view in perspective showing the head with its bar parallel to the plane of the head, with the head in the center of its travel.
Figures 2A, 2B:
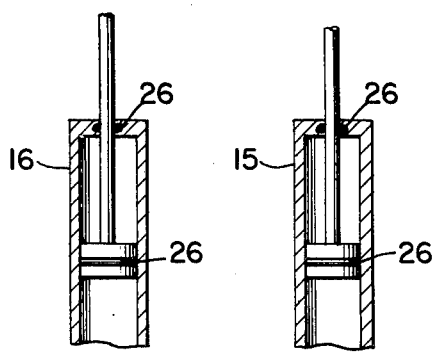
FIG. 2A is a detailed sectional view of a cylinder taken along the line 2A—2A of FIG. 2.
FIG. 2B is a sectional view taken along the line 2B—2B of FIG. 2.
Figure 3:
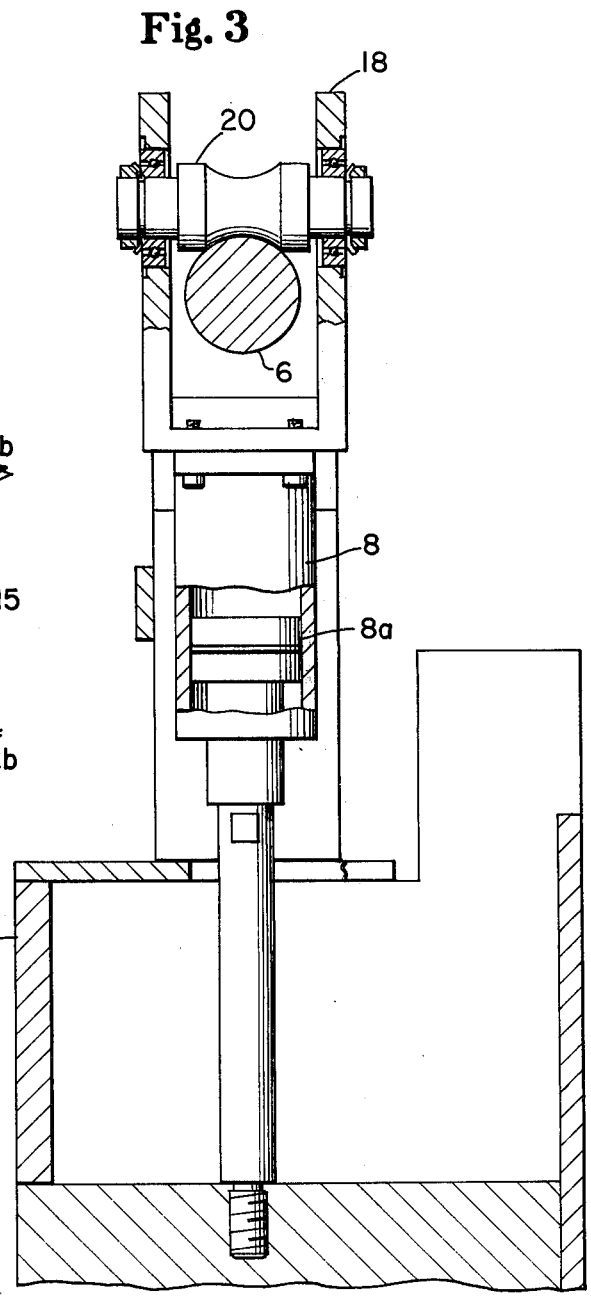
FIG. 3 is a detailed sectional view taken along the line of 3—3 of FIG. 5.

Referring to FIG. 1, we use the balance bar 6 floatably attached to the vertical saddle 2 and supported by means of counterbalance cables 5 and 22. These cables, in turn, are attached to the bracket on the rear of the column 1 tensioned by means of counterbalance cylinder 15 (FIG. 2). Counterbalance cables 5 and 22 are directed to the counterbalance cylinder 15 through brackets 10 and pulleys 11 across the topy of the column 1 (FIG. 1). The headstock 3 is supported by means of hydraulic counterbalance cylinder 8 attached to the headstock 3 at its center of gravity. Cylinder 8 is provided with the yoke and roller assembly indicated at 18 which transfers the weight of the headstock 3 to the balancing bar 6. The headstock 3 moves transversely along the vertical saddle 2. The weight of the head is applied to various positions on counterbalance bar 6. As the head moves, the distribution of weight between cables 5 and 22 varies with the headstock position. This distrubtion of weight changes the tension in cables 5 and 22 and the increased tension causes the cables to stretch or contract accordingly. The position of the counterbalance bar 6 is thus changed relative to earth level. The pressure in hydraulic cylinder 8 is adjusted so that it exactly counterbalances the weight of headstock 3. Hydraulic pressure is also applied to counterbalance cylinder 15. The area of the cylinders is such so that they provide equal and opposite forces with respect to the counterbalance bar 6. Thus, the summation of tension forces created on counterbalance bar 6 by means of cables 5 and 22 is equal to the forces created on counterbalance bar 6 by cylinder 8.

The headstock 3 is connected directly to a cylinder 8 having a piston 8A. The travel of piston 8A being such that it is greater than the elongation of counterbalance cables 5 and 22, the elongation of cables 5 and 22 being caused by the variation in the position of the headstock along saddle 2. As the headstock moves transversely the counterbalance cables automatically adjust themselves.

Figure 4:
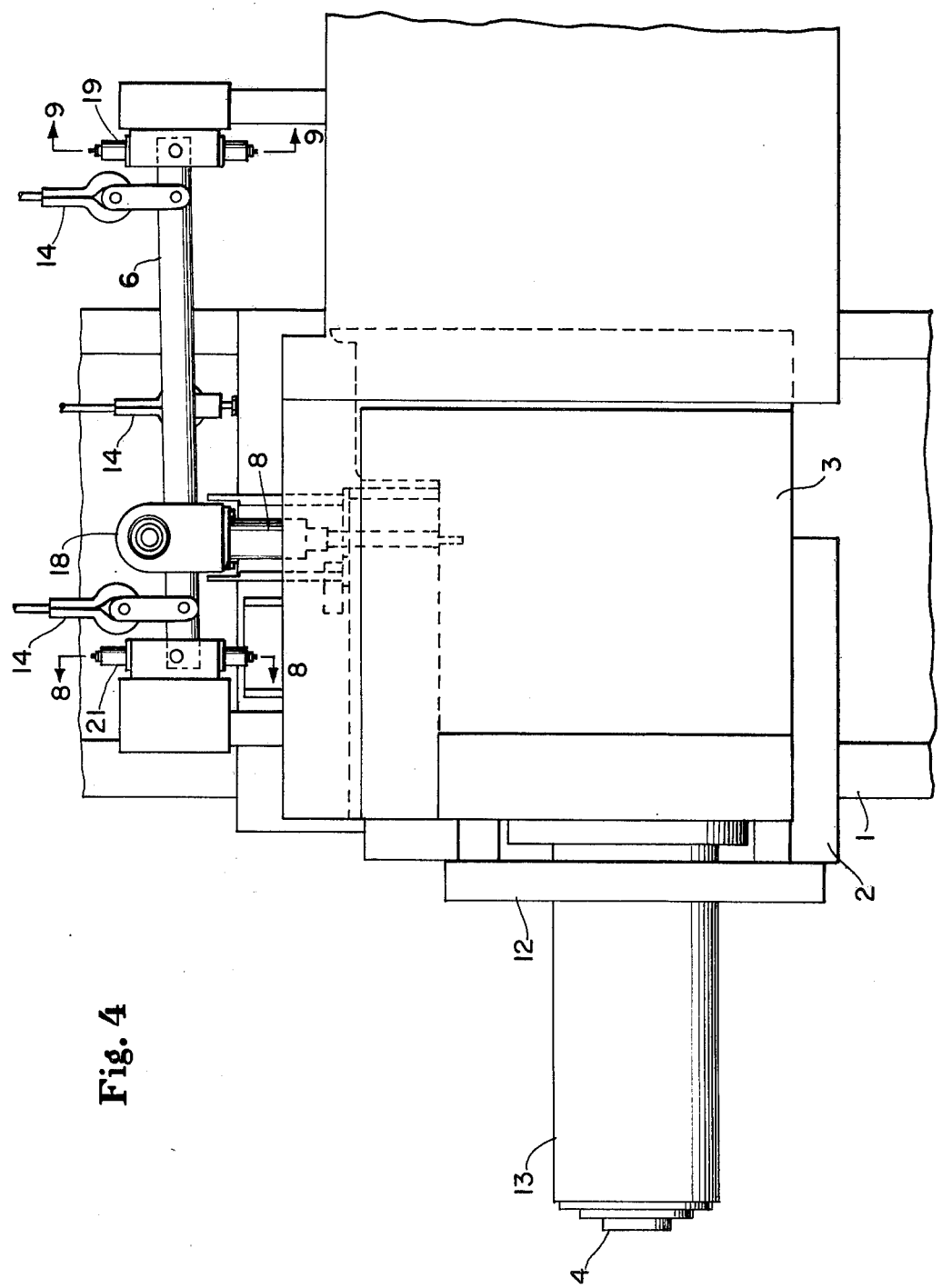
FIG. 4 is a view showing the head in its extended position indicating the downward tilt of the forward end of the counterbalance bar.
Figure 5:
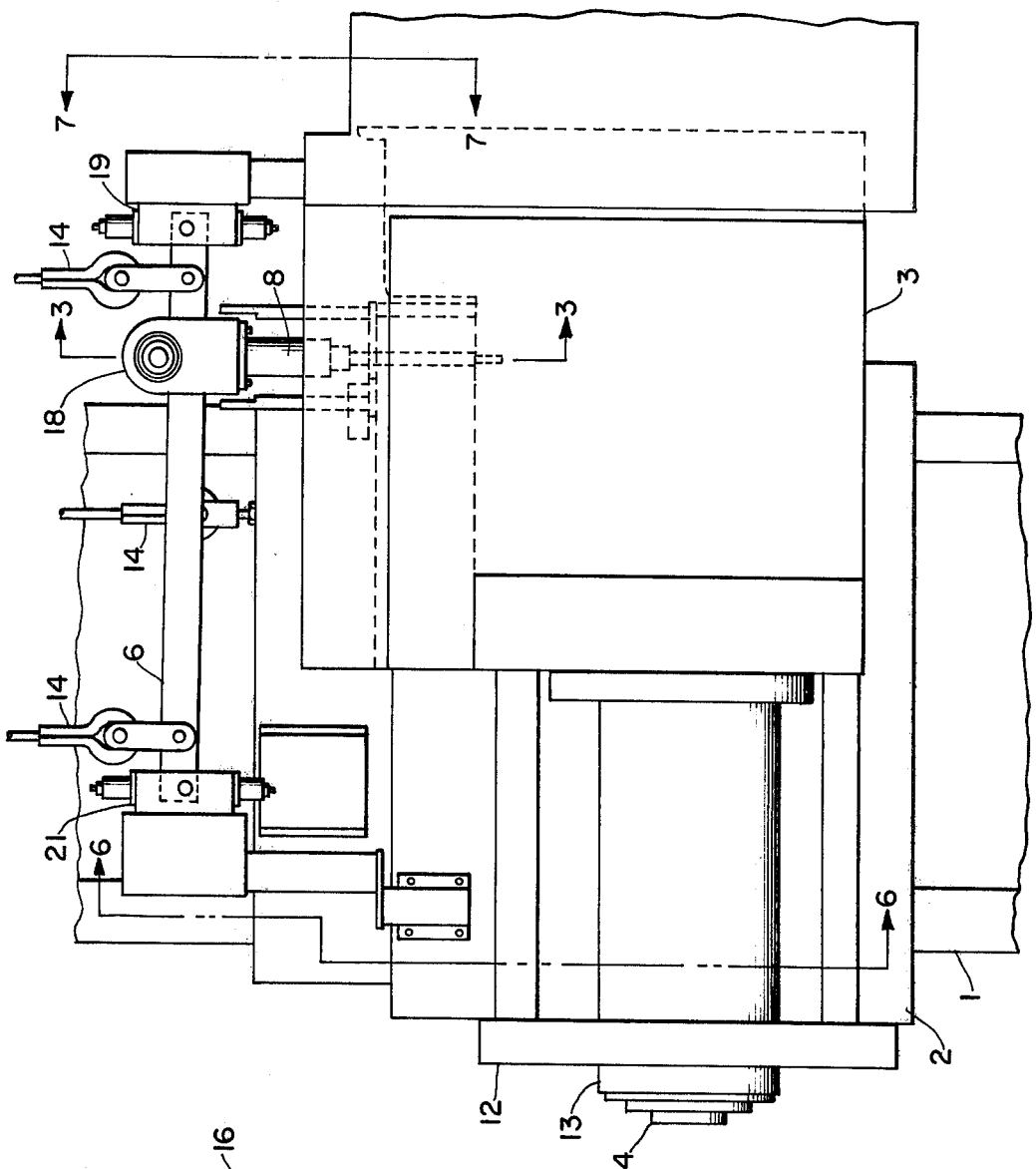
FIG. 5 is a view showing the head in its retracted position indicating downward tilt of the counterbalance bar at its rear end.

The bar 6 is tiltable proportional to the elongation of the cable as the headstock 3 is moved to the left in the drawing (FIG. 4) the bar 6 will deflect downwardly, and the deflection of the bar will be compensated by the movement of the piston 8A downwardly so that the headstock 3 remains in a balanced state while in its extended position on the ways and bar is in a deflected state.

Since the counterbalance bar 6 is floatably attached to the vertical saddle by means of the balance bar support shoe 23 and support shoe spring 24, the amount of load transferred to the vertical saddle is negligible.

Figure 11:
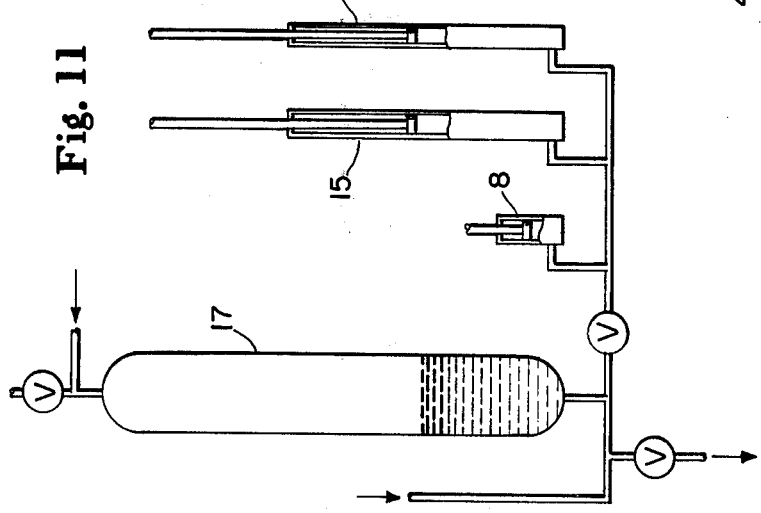
FIG. 11 is a hydraulic diagram.
Figure 6:
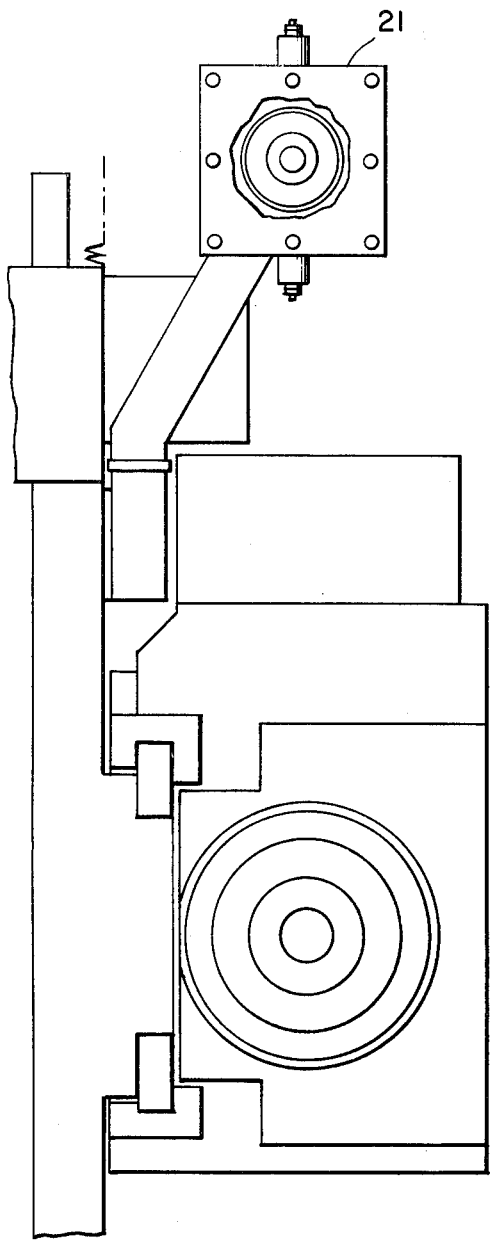
FIG. 6 is a sectional view taken along the line 6—6 of FIG. 5.
Figure 7:
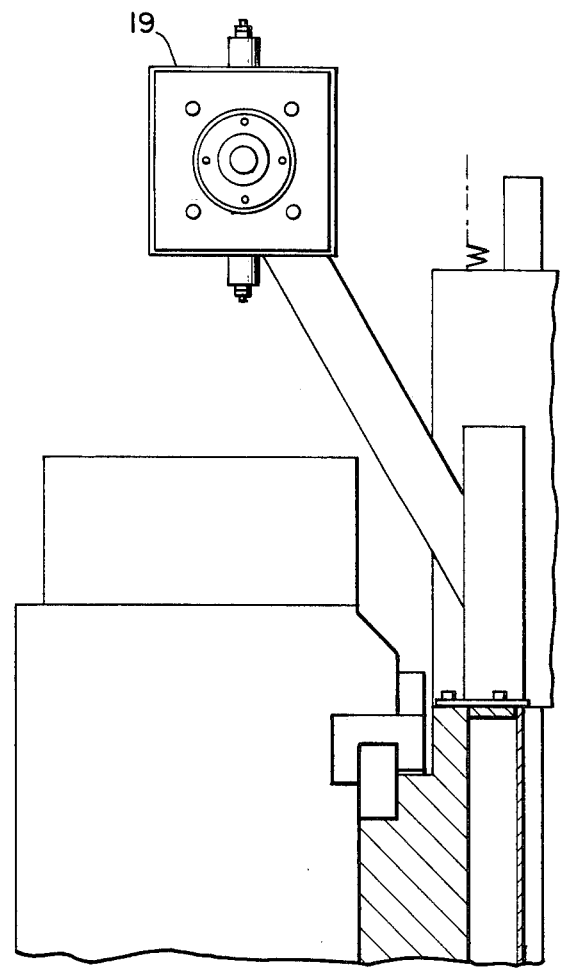
FIG. 7 is a detailed sectional view taken along the line 7—7 of FIG. 5.
Figure 12:
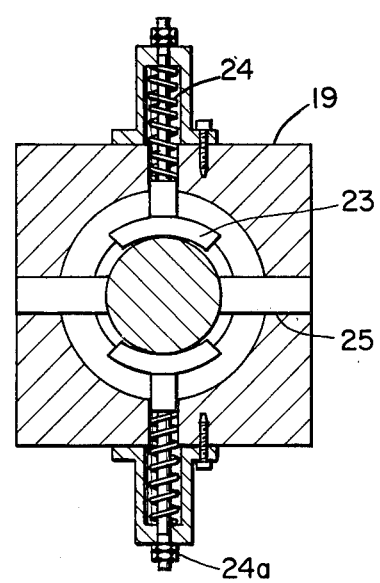
FIG. 12 is a detailed sectional view taken along the line 12—12 of FIG. 2.
Figure 8:
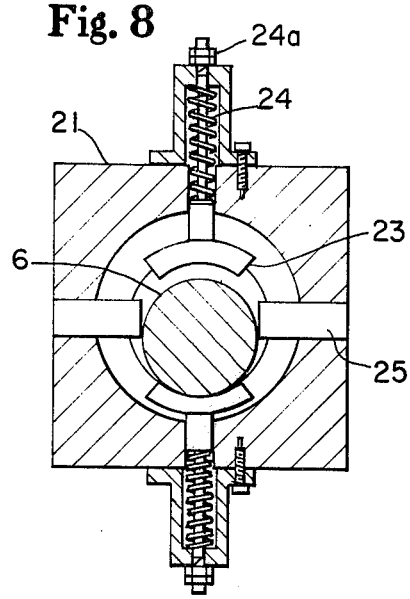
FIG. 8 is a detailed sectional view taken along the line 8—8 of FIG. 4.
Figure 9:
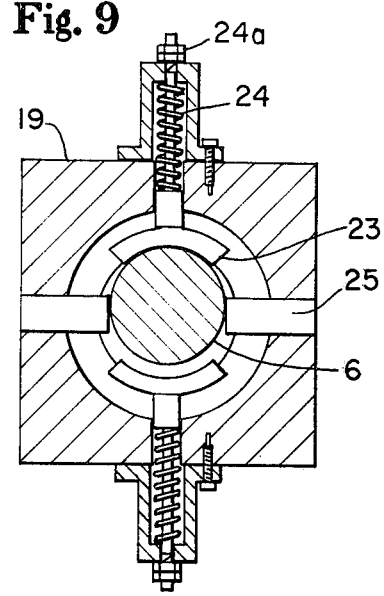
FIG. 9 is a detailed sectional view taken along the line 9—9 of FIG. 4.
Figure 10:
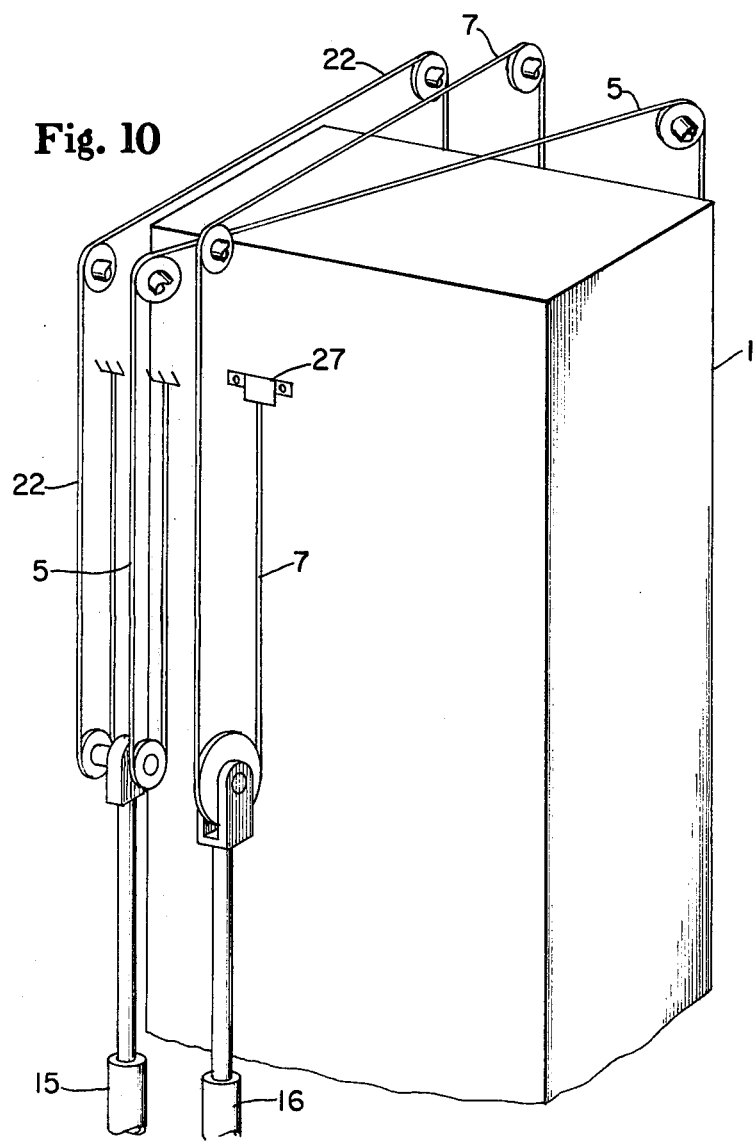
FIG. 10 is a view showing the rear of the machine.

Therefore, the headstock 3 is truly counterbalanced without transferring any deflective loads to the saddle 2 as the headstock moves transversely along the vertical saddle. The load of the spring is such that balance bar 6 will move vertically with the vertical saddle 2 as the vertical saddle moves vertically with reference to column 1. The design of the balance bar support shoe assembly (FIG. 8) is designed such that the forces centralize the bar 6 when the headstock 3 is in the center of its travel. This position is adjusted by means of locknuts 24A at the extreme end of counterbalance shoes 23. In addition to counterbalancing the headstock 3, a separate vertical counterbalance system is provided by means of counterbalance cable 7 attached to one end of vertical saddle 2 and to the bracket 27 on the rear of the column 1. The counterbalance cylinder 16 for the vertical saddle 2 is mounted adjacent to the counterbalance cylinder 15 for the headstock. The pressure for the three counterbalance cylinders described above is provided by means of a closed circuit accumulator 17 (FIG. 11).

I claim:

1. In a machine tool of the type including an upright column movably supported on a bed, a saddle movable vertically along a guide surface of the column, and a headstock displaceable laterally of the column while being guided by the saddle, an improved balancing arrangement, for the headstock comprising, in combination, a counterbalance bar supported at each of its ends by independent cables tensioned by a common cylinder attached to the base of the column, the headstock counterbalanced by means of a second hydraulic cylinder connected to a point corresponding to the center of gravity of said headstock, a roller and yoke connected to said second cylinder, said roller and yoke movable on said counterbalance bar, in response to the traverse of the headstock.

2. A balancing arrangement for the headstock of the machine tool as claimed in claim 1, including said counterbalance bar tiltable in response to the position of the headstock, said counterbalance bar floatably connected to the vertical saddle by means of self centering spring loaded elements.

3. A balancing arrangement of the headstock as claimed in claim 1, said headstock movable transversely on a saddle, said saddle independently counterbalanced by a cable secured to a piston mounted on the base of the column.